(12) United States Patent
Vogelsang

(10) Patent No.: US 12,475,969 B2
(45) Date of Patent: Nov. 18, 2025

(54) DYNAMIC RANDOM ACCESS MEMORY (DRAM) DEVICE WITH VARIABLE BURST LENGTHS

(71) Applicant: Rambus Inc., San Jose, CA (US)

(72) Inventor: Thomas Vogelsang, Mountain View, CA (US)

(73) Assignee: Rambus Inc., San Jose, CA (US)

( * ) Notice: Subject to any disclaimer, the term of this patent is extended or adjusted under 35 U.S.C. 154(b) by 214 days.

(21) Appl. No.: 18/367,381

(22) Filed: Sep. 12, 2023

(65) Prior Publication Data

US 2024/0177794 A1    May 30, 2024

Related U.S. Application Data

(60) Provisional application No. 63/406,593, filed on Sep. 14, 2022.

(51) Int. Cl.
*G11C 11/4093* (2006.01)
*G11C 11/408* (2006.01)
*G11C 29/52* (2006.01)

(52) U.S. Cl.
CPC .......... *G11C 29/52* (2013.01); *G11C 11/4087* (2013.01); *G11C 11/4093* (2013.01)

(58) Field of Classification Search
CPC .................... G11C 11/401; G11C 11/4087
USPC ........................................................ 365/149
See application file for complete search history.

(56) References Cited

U.S. PATENT DOCUMENTS

| | | | |
|---|---|---|---|
| 5,426,606 A * | 6/1995 | Takai | G11C 7/1072 365/233.17 |
| 5,473,575 A | 12/1995 | Farmwald et al. | |
| 5,621,340 A | 4/1997 | Donnelly et al. | |
| 5,896,404 A | 4/1999 | Kellogg et al. | |
| 5,923,595 A | 7/1999 | Kim | |
| 6,557,090 B2 | 4/2003 | Ho | |
| 6,957,308 B1 | 10/2005 | Patel | |
| 7,017,010 B2 | 3/2006 | La | |
| 9,190,127 B2 | 11/2015 | Jang | |
| 2018/0358060 A1* | 12/2018 | Cha | G11C 7/106 |
| 2022/0093202 A1* | 3/2022 | Wadhawan | G11C 29/1201 |

* cited by examiner

*Primary Examiner* — Anthan Tran
(74) *Attorney, Agent, or Firm* — Lowenstein Sandler LLP

(57) ABSTRACT

Technologies for dynamic random access memory (DRAM) devices with variable burst lengths are described. One DRAM device includes a first mode of operation having a first burst length and a first column address range and a second mode of operation having a second burst length and a second column address range. Only one of the first burst length and the second burst length is a power of two. A first product of the first column address range and the first burst length and a second product of the second column address range and the second burst length are substantially the same. The DRAM device includes an error correction code (ECC) block to generate, receive, and store ECC parity associated with data in the first mode of operation and the second mode of operation.

20 Claims, 16 Drawing Sheets

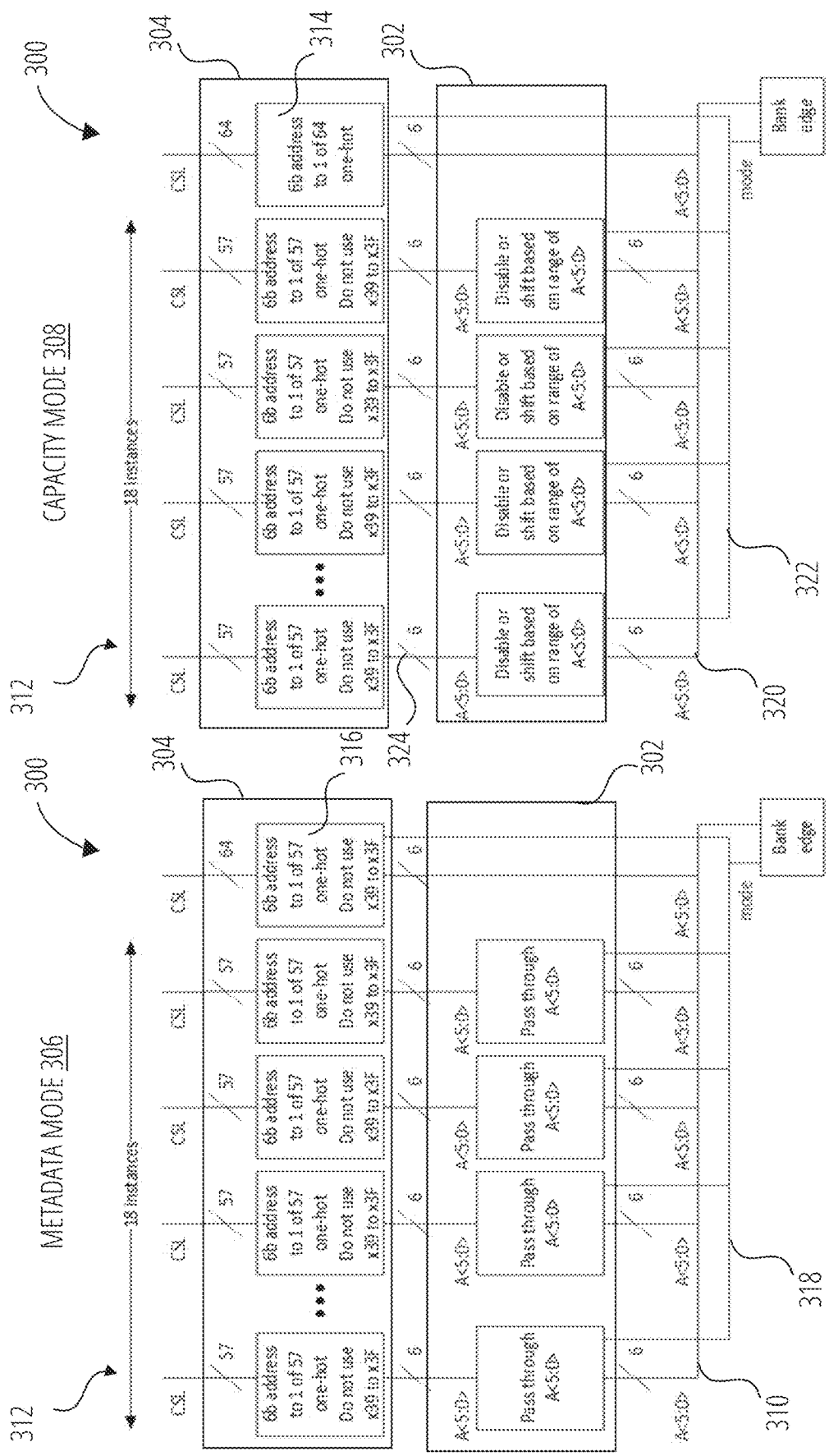

| Address | Block 1 | Block 2 | Block 3 | Block 4 | Block 5 | Block 6 | Block 7 | Block 8 | Block 9 | Block 10 | Block 11 | Block 12 | Block 13 | Block 14 | Block 15 | Block 16 | Block 17 | Block 18 |
|---|---|---|---|---|---|---|---|---|---|---|---|---|---|---|---|---|---|---|
| A0 | 1 | 1 | 1 | 1 | 1 | 1 | 1 | 1 | 1 | 1 | 1 | 1 | 1 | 1 | 1 | 1 |  | 16 |
| A1 | 1 | 1 | 1 | 1 | 1 | 1 | 1 | 1 | 1 | 1 | 1 | 1 |  | 1 |  |  |  | 16 |
| A2 | 1 | 1 | 1 | 1 | 1 | 1 | 1 | 1 | 1 | 1 | 1 | 1 | 1 | 1 | 1 | 1 |  | 16 |
| A3 | 1 | 1 | 1 | 1 | 1 | 1 | 1 | 1 | 1 | 1 | 1 | 1 |  | 1 |  |  |  | 16 |
| A4 | 1 | 1 | 1 | 1 | 1 | 1 | 1 | 1 | 1 | 1 | 1 | 1 | 1 | 1 | 1 | 1 |  | 16 |
| A5 | 1 | 1 | 1 | 1 | 1 | 1 | 1 | 1 | 1 | 1 | 1 | 1 |  | 1 |  |  |  | 16 |
| A6 | 1 | 1 | 1 | 1 | 1 | 1 | 1 | 1 | 1 | 1 | 1 | 1 | 1 | 1 | 1 | 1 |  | 16 |
| A7 | 1 | 1 | 1 | 1 | 1 | 1 | 1 | 1 | 1 | 1 | 1 | 1 |  |  |  |  | 1 | 16 |
| A8 | 1 | 1 | 1 | 1 | 1 | 1 | 1 | 1 | 1 | 1 | 1 | 1 | 1 |  |  |  | 1 | 16 |
| A9 | 1 | 1 | 1 | 1 | 1 | 1 | 1 | 1 | 1 | 1 | 1 | 1 |  |  |  |  | 1 | 16 |
| A10 | 1 | 1 | 1 | 1 | 1 | 1 | 1 | 1 | 1 | 1 | 1 | 1 | 1 |  |  |  | 1 | 16 |
| A11 | 1 | 1 | 1 | 1 | 1 | 1 | 1 | 1 | 1 | 1 | 1 | 1 |  |  |  |  | 1 | 16 |
| A12 | 1 | 1 | 1 | 1 | 1 | 1 | 1 | 1 | 1 | 1 | 1 | 1 | 1 |  |  |  | 1 | 16 |
| A13 | 1 | 1 | 1 | 1 | 1 | 1 | 1 | 1 | 1 | 1 | 1 | 1 |  |  |  |  | 1 | 16 |
| A14 | 1 | 1 | 1 | 1 | 1 | 1 | 1 | 1 | 1 | 1 | 1 | 1 |  |  |  |  | 1 | 16 |
| A15 | 1 | 1 | 1 | 1 | 1 | 1 | 1 | 1 | 1 | 1 | 1 | 1 |  |  | 1 | 1 | 1 | 16 |
| A16 | 1 | 1 | 1 | 1 | 1 | 1 | 1 | 1 | 1 | 1 | 1 | 1 |  |  | 1 | 1 | 1 | 16 |
| A17 | 1 | 1 | 1 | 1 | 1 | 1 | 1 | 1 | 1 | 1 | 1 | 1 |  |  | 1 | 1 | 1 | 16 |
| A18 | 1 | 1 | 1 | 1 | 1 | 1 | 1 | 1 | 1 | 1 | 1 | 1 |  |  | 1 | 1 | 1 | 16 |
| A19 | 1 | 1 | 1 | 1 | 1 | 1 | 1 | 1 | 1 | 1 | 1 | 1 |  |  | 1 | 1 | 1 | 16 |
| A20 | 1 | 1 | 1 | 1 | 1 | 1 | 1 | 1 | 1 | 1 | 1 | 1 |  |  | 1 | 1 | 1 | 16 |

| Range A<5:0> | Disable | 1 and 2 | 3 and 4 | 5 and 6 | 7 and 8 | 9 and 10 | 11 and 12 | 13 and 14 | 15 and 16 | 17 and 18 |
|---|---|---|---|---|---|---|---|---|---|---|
| x00 | 17 and 18 | x00:x06 | x00:x06 | x00:x06 | x00:x06 | x00:x06 | x00:x06 | x00:x06 | x00:x06 | - |
| x07 | 15 and 16 | x07:x0D | x07:x0D | x07:x0D | x07:x0D | x07:x0D | x07:x0D | x07:x0D | - | x00:x06 |
| x0E | 13 and 14 | x0E:x14 | x0E:x14 | x0E:x14 | x0E:x14 | x0E:x14 | x0E:x14 | - | x07:x0D | x07:x0D |
| x15 | 11 and 12 | x15:x1B | x15:x1B | x15:x1B | x15:x1B | x15:x1B | - | x0E:x14 | x0E:x14 | x0E:x14 |
| x1C | 9 and 10 | x1C:x22 | x1C:x22 | x1C:x22 | x1C:x22 | - | x15:x1B | x15:x1B | x15:x1B | x15:x1B |
| x23 | 7 and 8 | x23:x29 | x23:x29 | x23:x29 | - | x1C:x22 | x1C:x22 | x1C:x22 | x1C:x22 | x1C:x22 |
| x2A | 5 and 6 | x2A:x30 | x2A:x30 | - | x23:x29 | x23:x29 | x23:x29 | x23:x29 | x23:x29 | x23:x29 |
| x31 | 3 and 4 | x31:x37 | - | x2A:x30 | x2A:x30 | x2A:x30 | x2A:x30 | x2A:x30 | x2A:x30 | x2A:x30 |
| x38 | 1 and 2 | - | x31:x38 | x31:x38 | x31:x38 | x31:x38 | x31:x38 | x31:x38 | x31:x38 | x31:x38 |

DYNAMIC RANDOM ACCESS MEMORY (DRAM) DEVICE WITH VARIABLE BURST LENGTHS

RELATED APPLICATION

This application claims the benefits of U.S. Provisional Application No. 63/406,593, filed Sep. 14, 2022, the entire contents of which are hereby incorporated by reference.

BACKGROUND

Modern computer systems generally include one or more memory devices, such as on a memory module. The memory module may include, for example, one or more random access memory (RAM) devices or dynamic random access memory (DRAM) devices. A memory device can include memory banks made up of memory cells that a memory controller or memory client accesses through a command interface and a data interface within the memory device. The memory module can include one or more volatile memory devices. The memory module can be a persistent memory module with one or more non-volatile memory (NVM) devices.

There is a growing demand for server-grade DRAM devices to store more metadata for security and reliability purposes. Ideally, the additional metadata should be stored as part of a cache line to avoid accessing two cache lines, one for data and the other for metadata. The core architecture of a conventional DRAM device restricts how data can be accessed efficiently.

BRIEF DESCRIPTION OF THE DRAWINGS

The present disclosure is illustrated by way of example, and not by way of limitation, in the figures of the accompanying drawings.

FIG. 3A is a block diagram of a variable-burst-length DRAM device with an address modification block in a metadata mode, according to at least one embodiment.

FIG. 3B is a block diagram of a variable-burst-length DRAM device with an address modification block in a capacity mode, according to at least one embodiment.

FIGS. 4A-C illustrates a mapping table identifying disabled blocks given different ranges of the address, according to at least one embodiment.

FIG. 5 illustrates a mapping table identifying disabled blocks and shifted addresses based on a range of the address, according to at least one embodiment.

DETAILED DESCRIPTION

Figure 1:
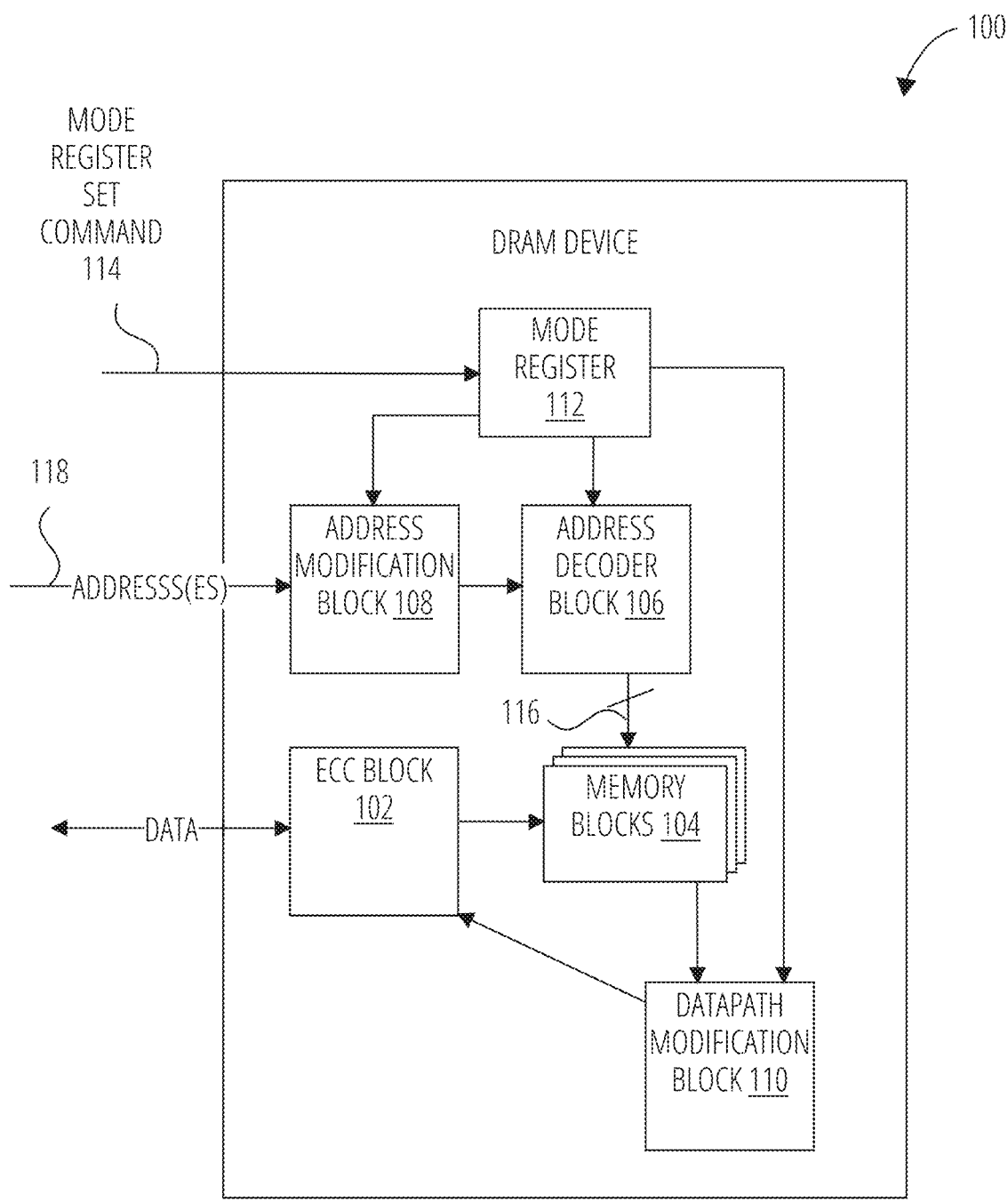
FIG. 1 is a block diagram of a dynamic random access memory (DRAM) device with two modes of operation having different combinations of burst lengths and column address ranges, according to at least one embodiment.

The following description sets forth numerous specific details, such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or presented in simple block diagram format to avoid obscuring the present disclosure unnecessarily. Thus, the specific details set forth are merely exemplary. Particular implementations may vary from these exemplary details and still be contemplated to be within the scope of the present disclosure.

Aspects of the present disclosure and embodiments address these problems and others by providing a DRAM device that supports access with metadata by extending a burst length or without metadata by reducing the burst length. Aspects of the present disclosure and embodiments are directed to a DRAM core architecture and a datapath architecture with two modes of operation, such as a metadata mode where more data is simultaneously accessed, and the number of column addresses is smaller, and a capacity mode where less data is simultaneously accessed, and the number of column addresses is larger. Some applications do not require as much metadata as the highest-end server applications.

In at least one embodiment, a variable-burst-length DRAM device has two modes of operation with two different combinations of burst lengths and column address ranges, where only one of the burst lengths is not a power of 2. For example, a first mode of operation can have a burst length with a power of two, and a second mode of operation can have a burst length with a non-power of two. Alternatively, the first mode of operation can have a burst length with a non-power of two, and the second mode can have a burst length with a power of two. In at least one embodiment, the different burst lengths can be changed by different programmable register settings. It should be noted that the programmable register settings may not necessarily be changed in connection with different modes of operation. For example, instead of changing modes, the burst lengths can be programmed by a mode register on the DRAM device. The mode register can store values representative of the respective burst length. This can be done by receiving a mode register set command at a command and address (CA) interface along with values to program into a mode register field. In at least one embodiment, the column address range of the mode with the longer burst is a ceiling function of the ratio of the shorter to the longer burst length multiplied by the column address range of the shorter burst. The ceiling function is the least integer greater than or equal to the output of the equation. For example, an equation that links burst length and column address range is provided below:

$$R_m = \text{ceiling}\left(\frac{B_c}{B_m} R_c\right) \quad (1)$$

where $R_m$ is an address range of a metadata mode, $R_c$ is an address range of a capacity mode, $B_m$ is the burst length in the metadata mode, and $B_c$ is the burst length of the capacity mode. Two examples could be as follows:

$$57 = \text{ceiling}\left(\frac{16}{18} 64\right) \text{ and} \quad (2)$$

$$64 = \text{ceiling}\left(\frac{16}{18} 72\right) \quad (3)$$

In at least one embodiment, the variable-burst-length DRAM device can include an on-die error correction code (ECC) and circuits to implement it. In such an embodiment a part of the memory array is used to store the parity information of the on-die ECC. This is described in more detail below.

The two modes can be switched between using a mode register set command. In another embodiment, instead of switching between two modes, a burst length of the variable-burst-length DRAM device can be programmed in a mode register by a mode register set command, the mode register storing values representative of the respective burst length. In at least one embodiment, the longer burst length is used to transmit metadata together with data, whereas the shorter burst transmits only data.

In at least one embodiment, a DRAM modal device has two column ranges, a smaller one for one mode and a larger one for the other mode. The DRAM modal device has local array data lines (LDQs) in memory blocks. The LDQs in the memory blocks, where a first amount of data (data and metadata in a metadata mode, data in a capacity mode) is stored, span across a first number of CSLs (smaller column address range). The LDQs in the memory blocks, where a second amount of data is stored, span across a second number of CSLs (larger column address range). In one embodiment, the second amount of data includes ECC parity stored across the larger column address range. In the mode with the smaller address range, some LDQs are not used based on the column address. That is, at least some addresses of an address space are not used in the second mode of operation (e.g., metadata mode). In some embodiments, ECC encoding and decoding use a codeword size of the mode with a smaller address range. In the mode with the larger address range, bits in the codeword that do not have cells in the associated array are assumed to be zero.

FIG. 1 is a block diagram of a dynamic random access memory (DRAM) device 100 with two modes of operation having different combinations of burst lengths and column address ranges, according to at least one embodiment. The DRAM device 100 includes an ECC block 102 (also referred to as an ECC circuit), a set of memory blocks 104, an address decoder block 106, an address modification block 108, a datapath modification block 110, and a mode register 112. The ECC block 102 can generate, receive, and store parity data associated with data in a first mode of operation or a second mode of operation. In at least one embodiment, the DRAM device 100 includes a first mode of operation having a first burst length and a first column address range and a second mode of operation having a second burst length and a second column address range. In this embodiment, only one of the first and second burst lengths is a power of two. The ECC block 102 can generate, receive, and store ECC parity associated with data in the first mode of operation and the second mode of operation. In at least one embodiment, a first product of the first column address range and the first burst length and a second product of the second column address range and the second burst length are substantially the same. The phrase "substantially the same" is defined as the column address range of the mode with the longer burst is the ceiling function of the ratio of the shorter to the longer burst length multiplied by the column address range of the shorter burst. In at least one embodiment, the first burst length is smaller than the second burst length and the second column address range is the ceiling function of a ratio of the first burst length to the second burst length multiplied by the first column address range. In at least one embodiment, the mode with a longer burst length (e.g., the second mode of operation) is used to transmit metadata together with data, and the mode with a shorter burst length (e.g., the first mode of operation) transmits only data.

An equation links burst length and column address range, such as illustrated above in equation (1). Two examples are provided above in equations (2) and (3).

In at least one embodiment, the ECC block 102 is an on-die ECC block. In at least one embodiment, the ECC block 102 uses a codeword size corresponding to the second column address range of the second mode of operation. In some embodiments, some bits in a codeword that do not have memory blocks associated with them are set to zero in the first mode of operation.

In at least one embodiment, a mode register set command 114 is used to switch between the two modes. The mode register 112 is configured to receive the mode register set command 114. The mode register 112 can store a first indication (e.g., a first value) indicative of the first mode of operation. The mode register 112 can store a second indication (e.g., a second value) indicative of the second mode of operation.

In at least one embodiment, the DRAM device 100 includes the address decoder block 106 coupled to a set of column select lines (CSLs) 116. Some CSLs of the set of CSLs 116 are active during an access of the set of memory blocks 104. The address modification block 108 can receive an address 118 (first address) in the first mode of operation and the address 118 (a second address) in the second mode of operation. In the first mode of operation, the address modification block 108 can disable or shift the first address to a third address based on a range of the first address before passing the third address to the address decoder block 106. In the second mode of operation, the address modification block 108 can pass the second address to the address decoder block 106.

In at least one embodiment, the mode register 112 can store a first value indicative of the first mode of operation or a second value indicative of the second mode of operation. The address decoder block 106 and the address modification block 108 are coupled to the mode register 112. The address modification block can pass through the address 118 to the address decoder block 106, responsive to the second value being stored in the mode register 112. The address modification block 108 can modify the address 118 before passing the address 118 through to the address decoder block 106 responsive to the first value being stored in the mode register 112. In at least one embodiment, the address modification block 108 can modify the address 118 by disabling a number of blocks based on a range of the address and shifting down the address 118 for each block after the range in which the number of blocks is disabled.

In at least one embodiment, the address decoder block 106 includes a set of one-hot decoders coupled to address modification block 108. The set of one-hot decoders can receive the second address in the second mode of operation and the third address in the first mode of operation. An additional one-hot decoder can receive the first address in the first mode of operation and the second address in the second mode of operation. Additional details regarding the address decoder block 106 and the address modification block 108 are described below with respect to FIG. 3A to FIG. 5.

In at least one embodiment, the first mode of operation is a capacity mode in which a first amount of data is accessed simultaneously with a first number of CSLs 116, and the second mode of operation is a metadata mode in which a second amount of data is accessed simultaneously with a second number of CSLs 116. The first amount of data is less than the second amount of data. The first number of CSLs is greater than the second number of CSLs 116. The first amount of data includes first data, and the second amount of data includes second data and metadata associated with the second data. In at least one embodiment, the first number of CSLs 116 is 64, and the second number of CSLs 116 is 57. In at least one embodiment, the first number of CSLs 116 is 72 and the second number of CSLs 116 is 64.

In another embodiment, the second mode of operation is a metadata mode in which more data is accessed simultaneously with a smaller number of column addresses than the first mode of operation. The first mode of operation is a capacity mode in which less data is accessed simultaneously with a larger number of column addresses than the metadata mode.

In at least one embodiment, each of the memory blocks 104 includes local array data lines (LDQs). In at least one embodiment, the second mode of operation is the metadata mode, and the first mode of operation is the capacity mode. The LDQs in the memory blocks 104, where the first amount of data is stored in the metadata mode, span across the first number of CSLs 116. The LDQs in the memory blocks 104, where the second amount of data is stored in the capacity mode, span across the second number of CSLs 116. In this embodiment, the second amount of data includes ECC parity. In the capacity mode, some of the set of memory blocks 104 are not used based on a column address of the address 118.

In at least one embodiment, the set of CSLs 116 includes 64 CSLs 116 per memory block. In this embodiment, 1 CSL 116 of the 64 CSLs 116 per memory block are active at a time. In this embodiment, there are seventeen blocks, and 136 bits are accessed during the access. The 136 bits include 128 bits of data and 8 bits of parity. In at least one embodiment, the 8 bits of parity are stored on a separate sub-word line (WL) as data. In at least one embodiment, there are sixteen blocks, and the 8 bits of parity are distributed between eight blocks of 9 bits per CSL and eight blocks of 8 bits per CSL, where each of the 8 bits of parity is in a block with 9 bits per CSL, and on a same sub-word line (WL) as data. In at least one embodiment, the set of CSLs 116 includes 1090 CSLs, with 19 CSLs of the 1090 CSLs 116 being active at a time, accessing 152 bits during the access. The 152 bits can include 144 bits of data and metadata and 8 bits of parity.

In at least one embodiment, the datapath modification block 110 includes a set of multiplexers and control logic coupled to the set of multiplexers and the mode register 112. The control logic can receive the address 118 and cause the set of multiplexers to pass data through to the ECC block 102 responsive to the second value being stored in the mode register 112. The control logic can cause a number of multiplexers of the set of multiplexers to pass a set of zeros to the ECC block 102 responsive to the first value being stored in the mode register 112. The number of multiplexers are identified by the range of the address. The control logic can cause the remaining multiplexers of the set of multiplexers to pass data through to the ECC block 102 responsive to the first value being stored in the mode register 112. The number of multiplexers corresponds to the number of blocks disabled. Additional details of the datapath modification block 110 are described below with respect to FIG. 6A and FIG. 10A.

Figure 2:
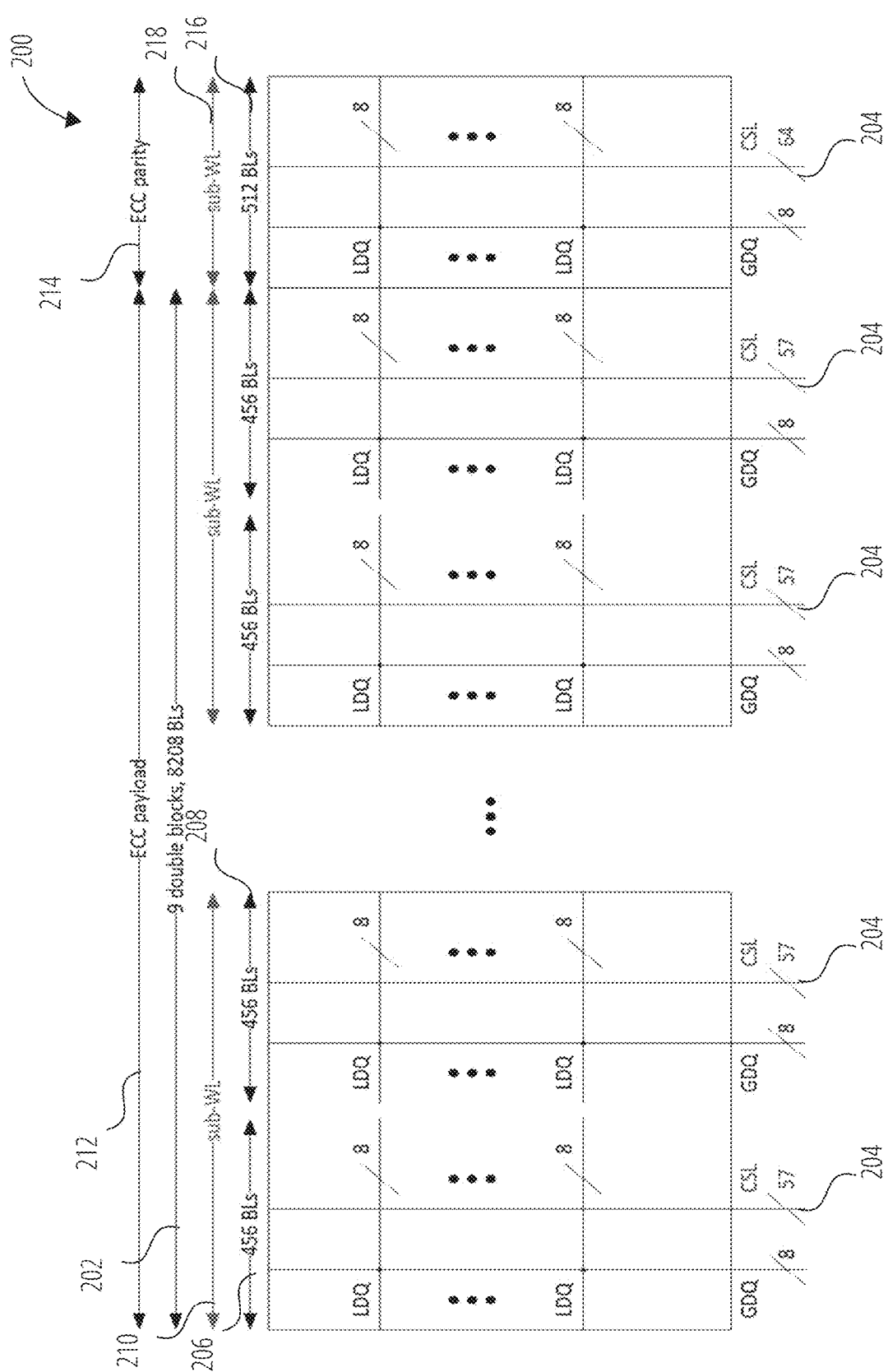
FIG. 2 illustrates an architecture of a variable-burst-length DRAM device with nine double blocks, each block with 57 column select lines (CSLs) for at least two burst lengths (e.g., two modes of operation), according to at least one embodiment.

FIG. 2 illustrates an architecture of a variable-burst-length DRAM device 200 with nine double blocks 202, each block with 57 column select lines (CSLs) for at least two burst lengths (e.g., two modes of operation), according to at least one embodiment. The variable-burst-length DRAM device 200 includes a grid array of cells organized in blocks that can be addressed by the CSLs 204. Data from the cells of the memory blocks can be input and output on corresponding local array data lines (LDQs) and global array data lines (GDQs).

Each double block of the variable-burst-length DRAM device 200 includes a first block with 456 bit lines 206 and a second block with 456 bit lines 208 within one sub-WL 210. The nine double blocks 202 can store an ECC payload 212. The variable-burst-length DRAM device 200 also includes a block for ECC parity 214. The block includes 512 bit lines 216 with one sub-WL 218. In this embodiment, either 17 or 19 CSLs 204 are simultaneously active for a given access. For the given access, the variable-burst-length DRAM device 200 provides 136$b$ per access with 128 bits of data and 8 bits of parity (17·8b=136b (128b data, 8b parity)) or 152b per access with 144 bits of data and 8 bits of parity. In this case, the ECC parity 214 is stored in a block separate from data in other memory blocks. In another embodiment, the ECC parity 214 can be distributed with the data, but there would be 9 blocks with 9 bits and 9 blocks with 8 bits, mixing ECC parity on the same sub-WLs as data. The variable-burst-length DRAM device 200 can be switched between a first mode of operation and a second mode of operation. As described above, the variable-burst-length DRAM device 200 has two different combinations of burst length and column address range where one of the burst lengths is not a power of 2. The column address range of the mode with the longer burst is the ceiling function of a ratio of the shorter to the longer burst length multiplied by the column address range of the shorter burst.

In at least one embodiment, LDQs in the blocks where payload (data and metadata) are stored stretch across the smaller column address range, and LDQs in the blocks where ECC parity is stored stretch across the larger column address range. In at least one embodiment, some LDQs are not used based on the column address in the mode with the larger address range.

As described above, the longer burst length is used to transmit metadata together with data, and the shorter burst transmits only data. That is, the second mode of operation can be used to transmit or receive metadata together with data, and the first mode of operation can be used to transmit or receive only data. For example, the first mode of operation can be a capacity mode with a shorter burst length, and the second mode of operation can be a metadata mode with a longer burst length, such as illustrated in FIG. 3A and FIG. 3B.

FIG. 3A is a block diagram of a variable-burst-length DRAM device 300 with an address modification block 302 in a metadata mode 306, according to at least one embodiment. The address modification block 302 can be used to modify column addressing between the two modes of different burst lengths. In the metadata mode 306, a first amount of data is accessed simultaneously with a first number of CSLs (e.g., 18 CSLs, 1 each in a block of 57 CSLs) as determined by an address 310 received at the variable-burst-length DRAM device 300 (labeled as from a bank edge). Since there are 57 CSLs per block, some of the address space is not used (e.g., x39 to x3F). The address modification block 302 receives the address 310, and the address modification block 302 passes the address 118 to an address decoder block 304. That is, the address modification block 302 does not modify the address 118 in the metadata mode 306 since it has a larger burst length. In at least one embodiment, a mode indication 318 can be received at the variable-burst-length DRAM device 300 (labeled as from the bank edge). The mode indication 318 can originate from a mode register. The mode register can be switched using a mode register set command. The address modification block 302 and the address decoder block 304 can receive the mode indication 318, indicating the metadata mode 306.

In at least one embodiment, the address decoder block 304 includes a set of one-hot decoders 312 coupled to the address modification block 302. The set of one-hot decoders 312 can receive the unmodified address 310 from the address modification block 302. Each of the set of one-hot decoders 312 can be configured to decode the address 310 to 1 of 57 CSLs in the metadata mode 306. In at least one embodiment, the set of one-hot decoders 312 is 18 for 18 instances for a page without including the parity (18*57*8=8,208 bits). In this embodiment, some of the address space is not used (e.g., x39 to x3F). The address decoder block 304 also includes an additional one-hot decoder 316. The additional one-hot decoder 316 can receive the address 310 in the metadata mode 306. The additional one-hot decoder 316 can be configured to decode the address 310 to 1 of 57 CSLs in the metadata mode 306. The additional one-hot decoder 316 can be used for the parity of the page.

FIG. 3B is a block diagram of a variable-burst-length DRAM device 300 with the address modification block 302 in a capacity mode 308, according to at least one embodiment. As described above, the address modification block 302 can be used to modify column addressing between the two modes of different burst lengths. In the capacity mode 308, a second amount of data is accessed simultaneously with a second number of CSLs (e.g., 16 CSLs, 1 each in 16 of the 18 blocks of 57 CSLs) as determined by an address 320 received at the variable-burst-length DRAM device 300 (labeled as from a bank edge). The address modification block 302 receives the address 320, and the address modification block 302 can disable or shift the address 320 based on a range before passing a modified address 324 to the address decoder block 304. That is, the address modification block 302 can modify the address 320 accordingly to disable or shift based on a range of the address 320 in the capacity mode 308 since it has a shorter burst length. In at least one embodiment, a mode indication 322 can be received at the variable-burst-length DRAM device 300 (labeled as from the bank edge). The mode indication 322 can originate from the mode register. The mode register can be switched using a mode register set command. The address modification block 302 and the address decoder block 304 can receive the mode indication 322, indicating the capacity mode 308.

In at least one embodiment, the set of one-hot decoders 312 can receive the modified address 324 from the address modification block 302. Each of the set of one-hot decoders 312 can be configured to decode the address 324 to 1 of 57 CSLs in the capacity mode 308. The capacity mode 308 uses only 16 of the 18 instances (16*57*8=8,192 bits). In this embodiment, two blocks are not used for each access. In this embodiment, some of the address space is not used (e.g., x39 to x3F). The additional one-hot decoder 316 can receive the address 320 (original address) in the capacity mode 308. The additional one-hot decoder 316 can be configured to decode the address 310 to 1 of 64 CSLs in the capacity mode 308. The additional one-hot decoder 316 can be used for the parity of the page.

As described above, the first amount of data is greater than the second amount of data, yet the first number of CSLs (e.g., 57) in the metadata mode 306 is less than the second number of CSLs (e.g., 64) in the capacity mode 308. In the metadata mode 306, the first amount of data includes first data and metadata associated with the first data. In the capacity mode 308, the second amount of data includes second data (and no metadata). The addressing scheme in the capacity mode 308 is illustrated in a mapping table of FIGS. 4A-4C.

Figure 4B:
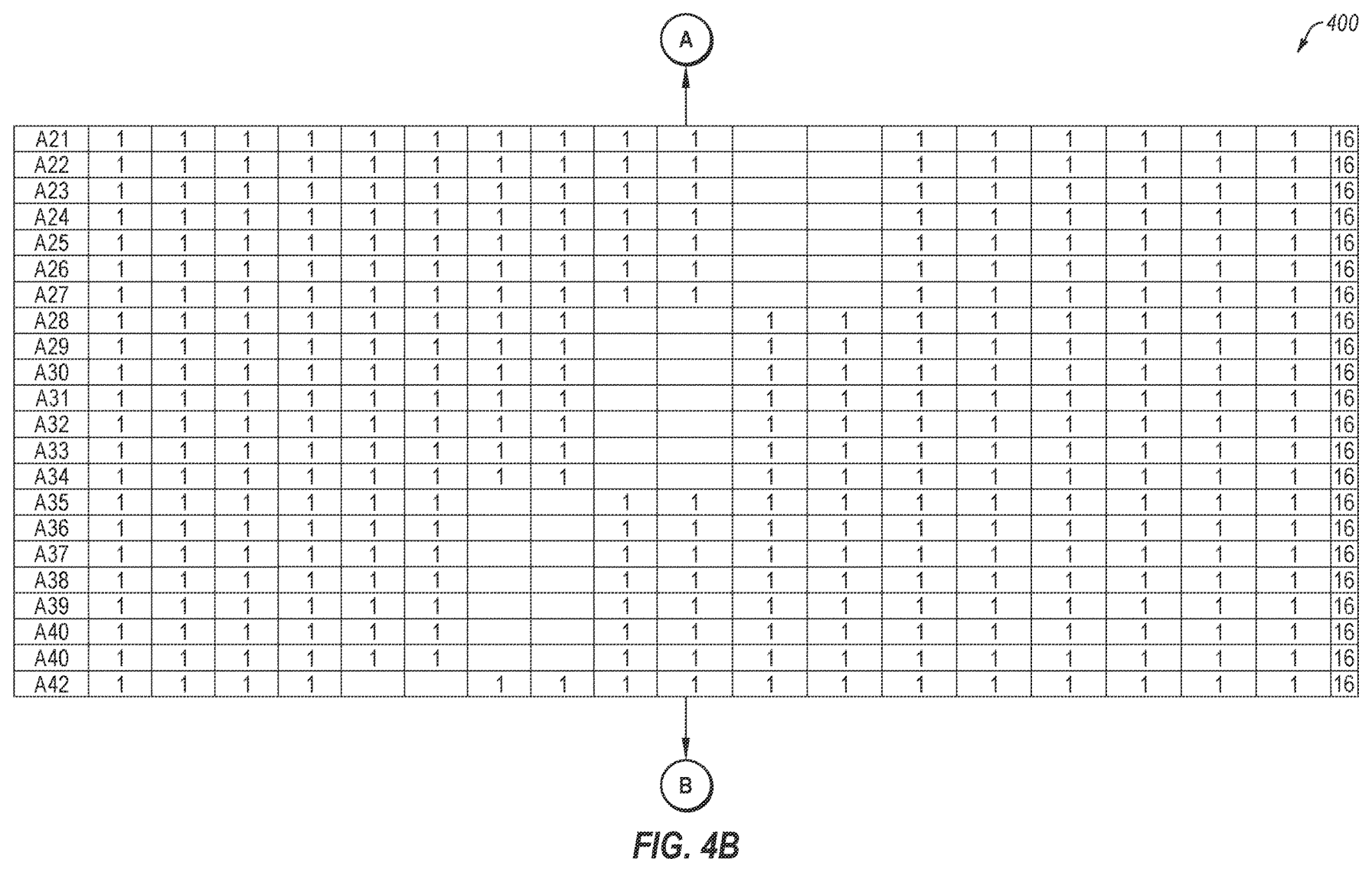
Figure 4C:
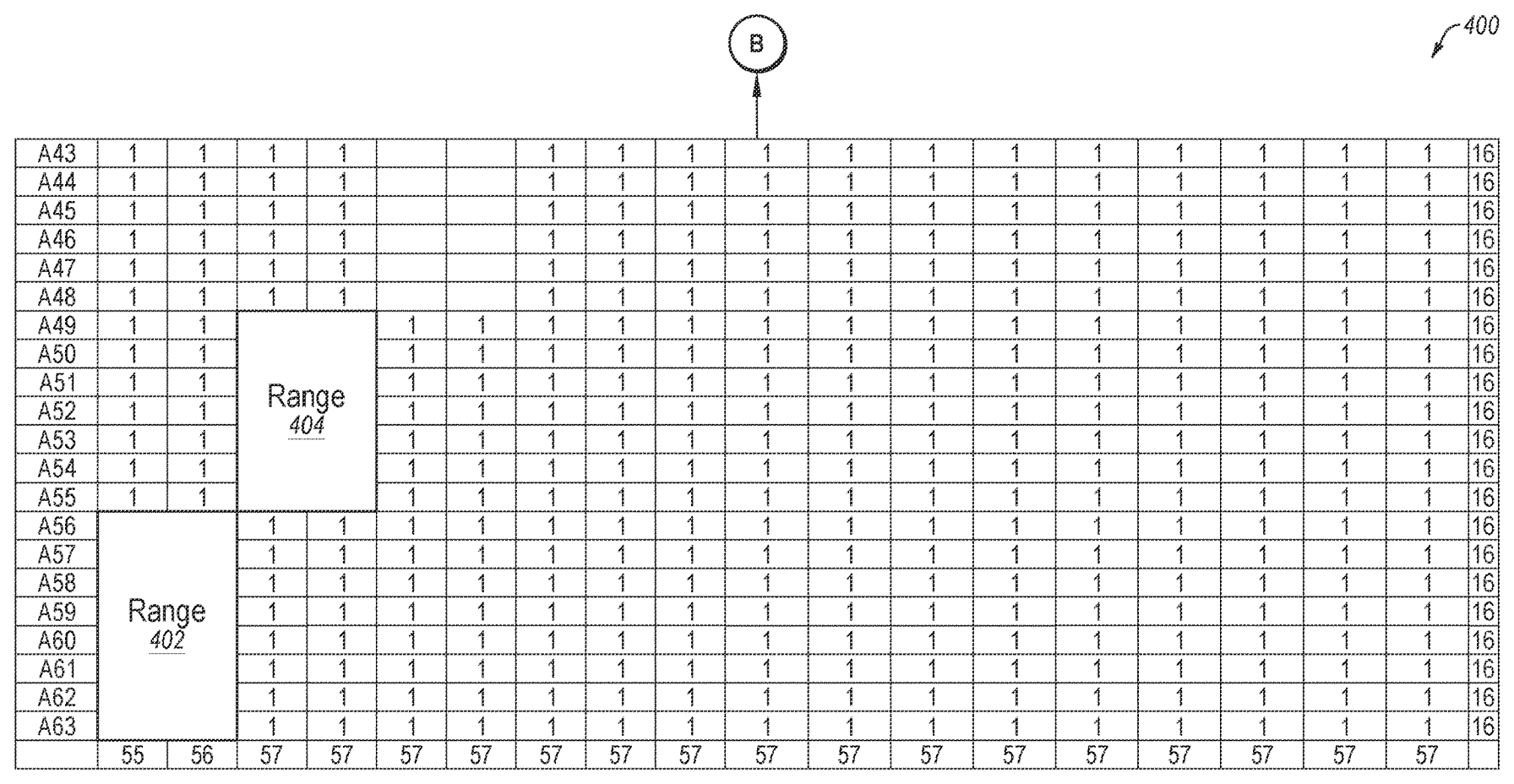

FIGS. 4A-C illustrates a mapping table 400 identifying disabled blocks given different ranges of the address, according to at least one embodiment. As described above, the capacity mode 308 has 64 column addresses, and the metadata mode 306 has 57 column addresses. As described above, two memory blocks (two CSLs) are not used in the capacity mode 308. The mapping table 400 identifies two disabled blocks based on a range of the address. Some addresses need to be shifted depending on the block so that two blocks are always disabled, and each block has a contiguous address range after the shift (e.g., 0x00 to 0x38). The address to each block after the disabled range needs to be shifted down. As shown in FIGS. 4A-4C, only 56 CSLs are used in the two leftmost blocks, while all 57 are used in the other blocks. For example, blocks 1 and 2 are disabled when the address is in a range 402 of A56 to A63. Blocks 3 and 4 are disabled when the address is in a range 404 of A49 to A55. When blocks 3 and 4 are disabled, the address range of A56 to A63 needs to be shifted to the range 404 of A49 to A55, as illustrated in FIG. 5.

FIG. 5 illustrates a mapping table 500 identifying disabled blocks and shifted addresses based on a range of the address, according to at least one embodiment. The mapping table 500 includes ranges 502, an indication of disabled blocks 504, and which blocks have shifted addresses 506. Addresses need to be shifted depending on the block so that two blocks are always disabled, and each block has a contiguous address range after a shift from the memory space 0x00 to 0x38 (0x39 to 0x3F are not used). In particular, the address to each block is shifted down after the range in which the blocks are disabled. For example, when blocks 13 and 14 are disabled, the range for blocks 15, 16, 17, and 18 is shifted down to the range of blocks 13, 14, 15, and 16.

As described above, an ECC block needs to use a systematic code so that the ECC payload can be expanded, if necessary, by adding zeros instead of metadata that is not stored. ECC encoding and decoding always uses the codeword size of the mode with the smaller address range. In the mode with the larger address range, bits in the codeword that do not have cells in the associated array are assumed to be zero. The masking of blocks in the capacity mode can be uniformly distributed. This approach is also applicable to other types of DRAM that may or may not need large amounts of metadata in the system, like High Bandwidth Memory (HBM) or Low-Power Double Data Rate (LPDDR). Additional details of datapath modifications needed to ensure the ECC block operates in both modes of operation are described below with respect to FIG. 6A and FIG. 6B.

Figure 6A:
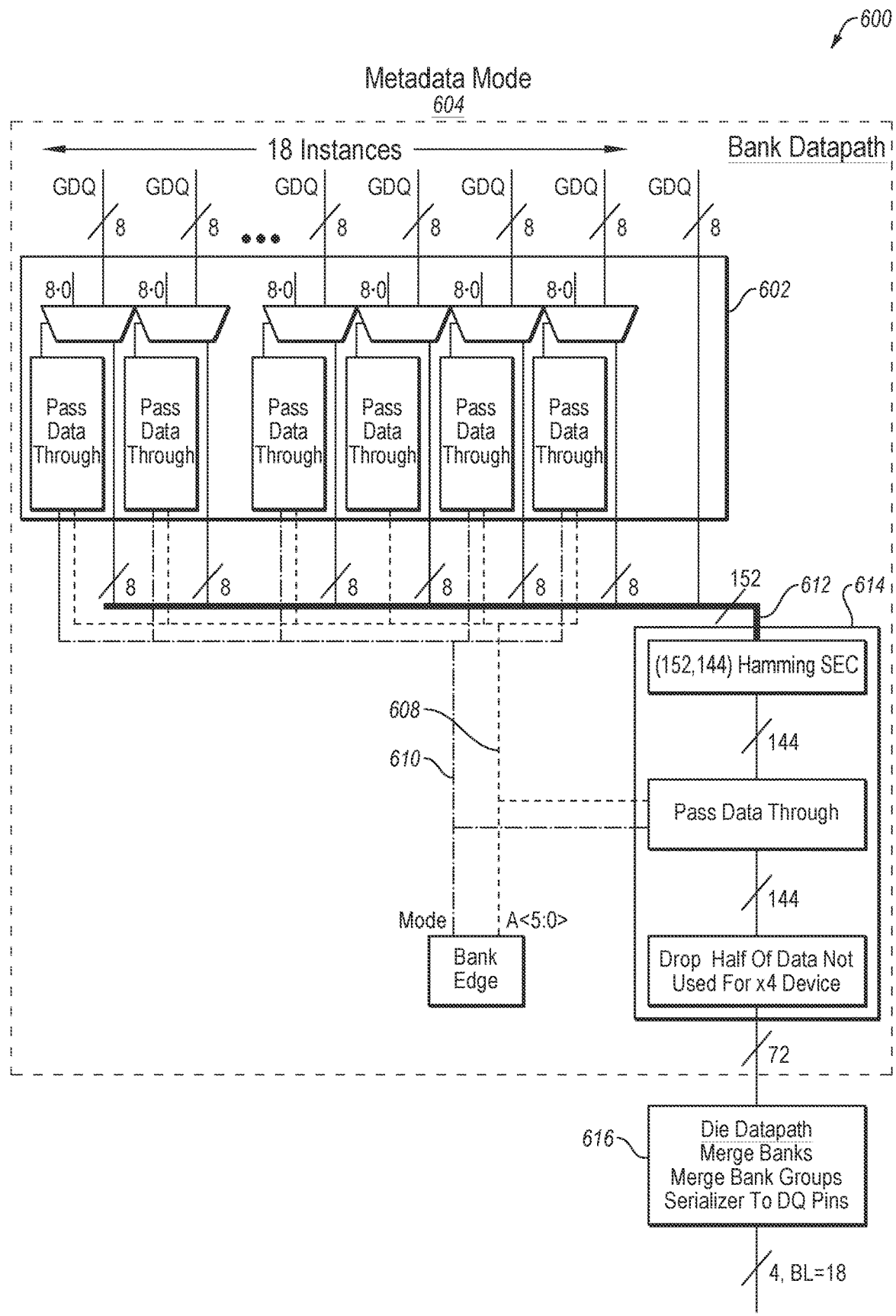
FIG. 6A is a block diagram of a variable-burst-length DRAM device with a datapath modification block in a metadata mode, according to at least one embodiment.

FIG. 6A is a block diagram of a variable-burst-length DRAM device 600 with a datapath modification block 602 in a metadata mode 604, according to at least one embodiment. The datapath modification block 602 can be used to modify data from global data lines (GDQs) between the two modes of different burst lengths. In the metadata mode 604, a first amount of data is accessed simultaneously with a first number of CSLs (e.g., 57 CSLs per block with 18 CSLs simultaneously access in the metadata mode) as determined by an address 608 and mode indication 610 received at the variable-burst-length DRAM device 600. The mode indication 610 can originate from the mode register. The mode register can be switched using a mode register set command. The datapath modification block 602 receives the address 608, and the datapath modification block 602 passes data 612 (data plus parity) to an ECC block 614. In at least one embodiment, the ECC block 614 is an on-die ECC block. In at least one embodiment, the ECC block 614 can implement a Hamming Single-Error Correction (SEC) algorithm (e.g., (152,144) hamming SEC). Alternatively, other ECC algorithms can be used. Since the data 612 is passed through the datapath modification block 602, the ECC block 614 can also pass through the resulting data to a die datapath 616. In at least one embodiment, the ECC block 614 can drop half of the data not used for the x4 device (e.g., 72 of the 144 bits output from the datapath modification block 602. In at least one embodiment, the die datapath 616 can merge banks, merge bank groups, or the like. In at least one embodiment, the die datapath 616 can include a serializer to serialize the data being output on the output terminals (DQ pins). The die datapath 616 can output the data with a first burst length (e.g., 18).

Figure 6B:
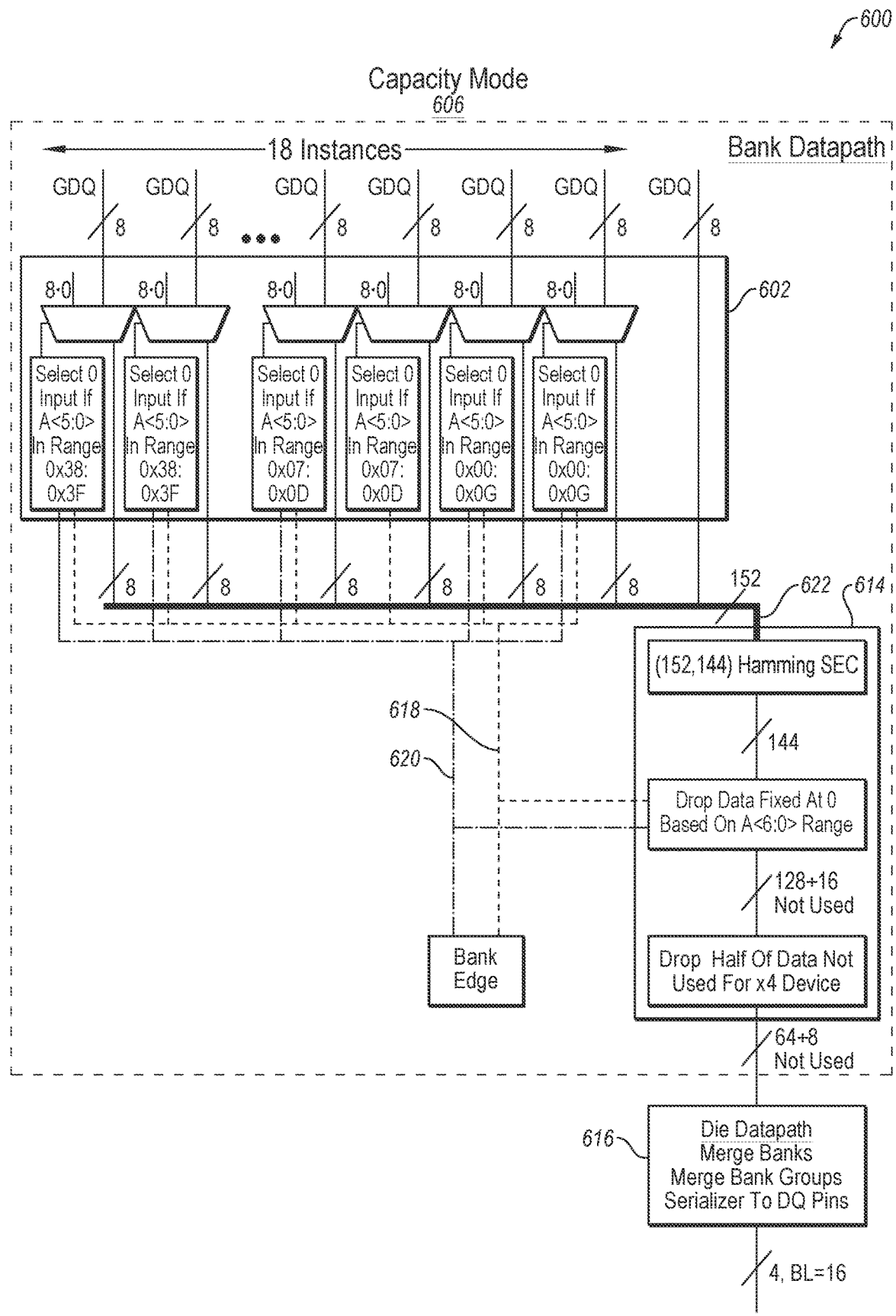
FIG. 6B is a block diagram of a variable-burst-length DRAM device with a datapath modification block in a capacity mode, according to at least one embodiment.

FIG. 6B is a block diagram of a variable-burst-length DRAM device 600 with the datapath modification block 602 in a capacity mode 606, according to at least one embodiment. As described above, the datapath modification block 602 can be used to modify data from the GDQs between the two modes of different burst lengths. In the capacity mode 606, a second amount of data is accessed simultaneously with a second number of CSLs (e.g., 16 CSLs in 16 of the 18 blocks with 57 CSLs and 1 CSL in the block with 64 CSLs) as determined by an address 620 and a mode indication 620 received at the variable-burst-length DRAM device 600. The mode indication 620 can originate from the mode register. The mode register can be switched using a mode register set command. The datapath modification block 602 receives the address 618, and the 602 can select data or zeros based on a range before passing data 622 (data plus parity) to the ECC block 614. That is, the datapath modification block 602 can add zeros accordingly based on a range of the address 618 in the capacity mode 606 since it has a shorter burst length. In at least one embodiment, the ECC block 614 can implement the Hamming SEC algorithm (e.g., (152,144) hamming SEC). Alternatively, other ECC algorithms can be used. Since the data 622 includes zeros, the ECC block 614 can drop the zero data that is fixed at specific positions in the data 622 based on the range of the address 618 (128 bits with 16 bits not used). In at least one embodiment, the ECC block 614 can drop half of the data not used for the x4 device (e.g., 64 of the 152 bits output from the datapath modification block 602). In at least one embodiment, the die datapath 616 can merge banks, merge bank groups, or the like. In at least one embodiment, the die datapath 616 can include a serializer to serialize the data being output on the output terminals (DQ pins). The die datapath 616 can output the data with a second burst length (e.g., 16).

Figure 7A:
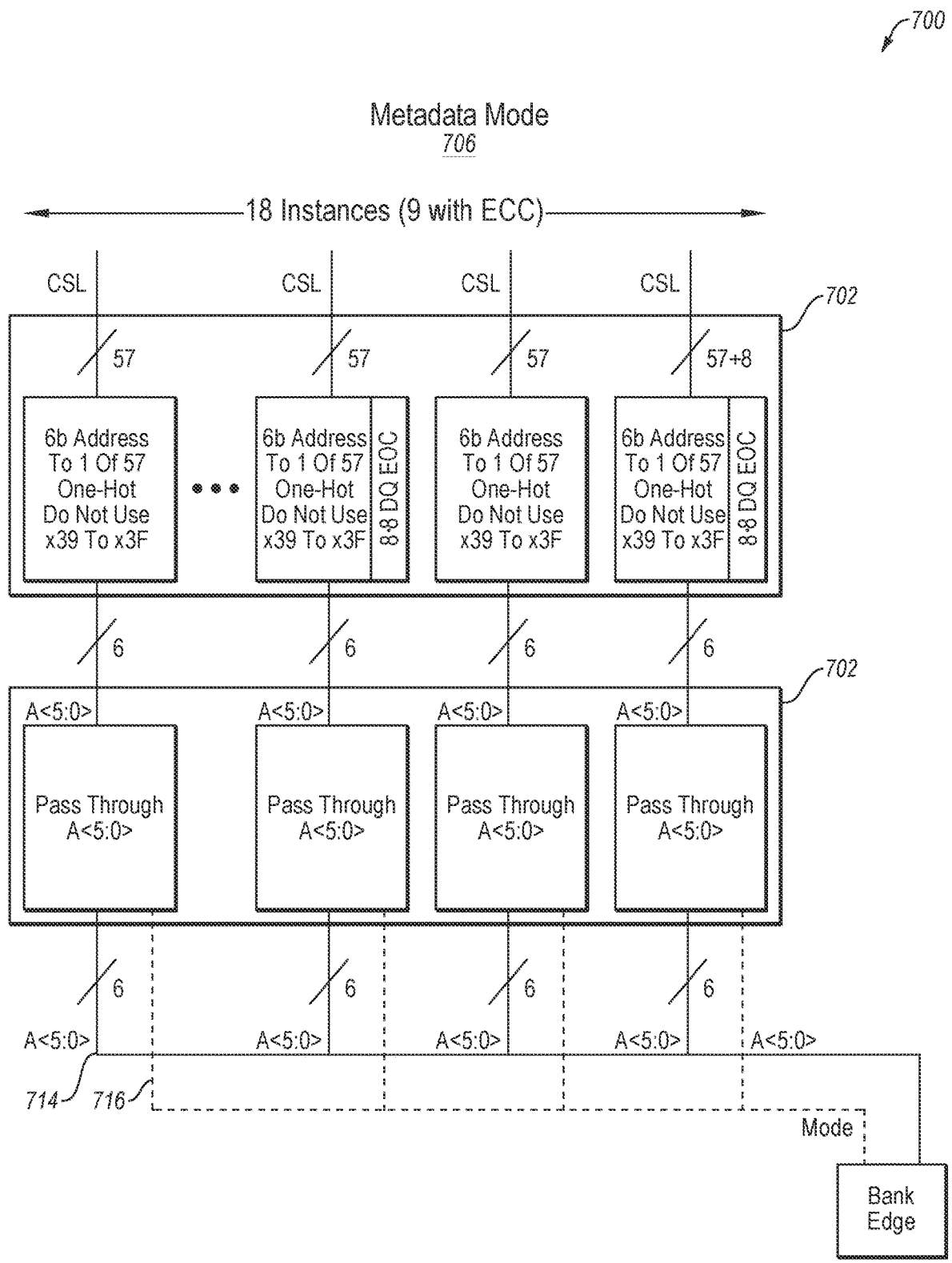
FIG. 7A is a block diagram of a variable-burst-length DRAM device with an address modification block in a metadata mode, according to at least one embodiment.

FIG. 7A is a block diagram of a variable-burst-length DRAM device 700 with a datapath modification block 702 in a metadata mode, according to at least one embodiment. The variable-burst-length DRAM device 700 is similar to the variable-burst-length DRAM device 300 of FIG. 3A, except the variable-burst-length DRAM device 700 has a distributed ECC structure in which parity is distributed with the data. In at least one embodiment, the 65 parity CSLs described above with respect to FIG. 3A and FIG. 3B are distributed over the 18 blocks by adding 8 CSLs to 9 of the blocks. Only the parity of eight blocks will be used at an access. In metadata mode, the block that is not used can be the same for every access and, in capacity mode, the block that will not be used is the disabled block as described in FIG. 5. In particular, the address decoder block 704 includes distributed ECC blocks, including ECC block 710 and ECC block 712, as illustrated in FIG. 7A. Data bits are addressed the same as when parity is in a separate block. Each block has its own part of the total address range, and a single CSL per block is active per access, providing the 8 parity bits distributed over 8 blocks in addition to the data bits. In the metadata mode 706, the datapath modification block 702 passes an address 714 to the address decoder block 704 based on a mode indication 716, which indicates the metadata mode 706. The address decoder block 704 can include multiple one-hot decoders, as described above. In the metadata mode 706, the last 7 CSL with addresses x39-x3F are not used. The datapath for parity bits needs an 8-bit wide horizontal bus spanning across all distributed parity blocks. This bus can be connected according to the parity address match with the blocks. The ECC correction is the same as when parity is in a separate block.

Figure 7B:
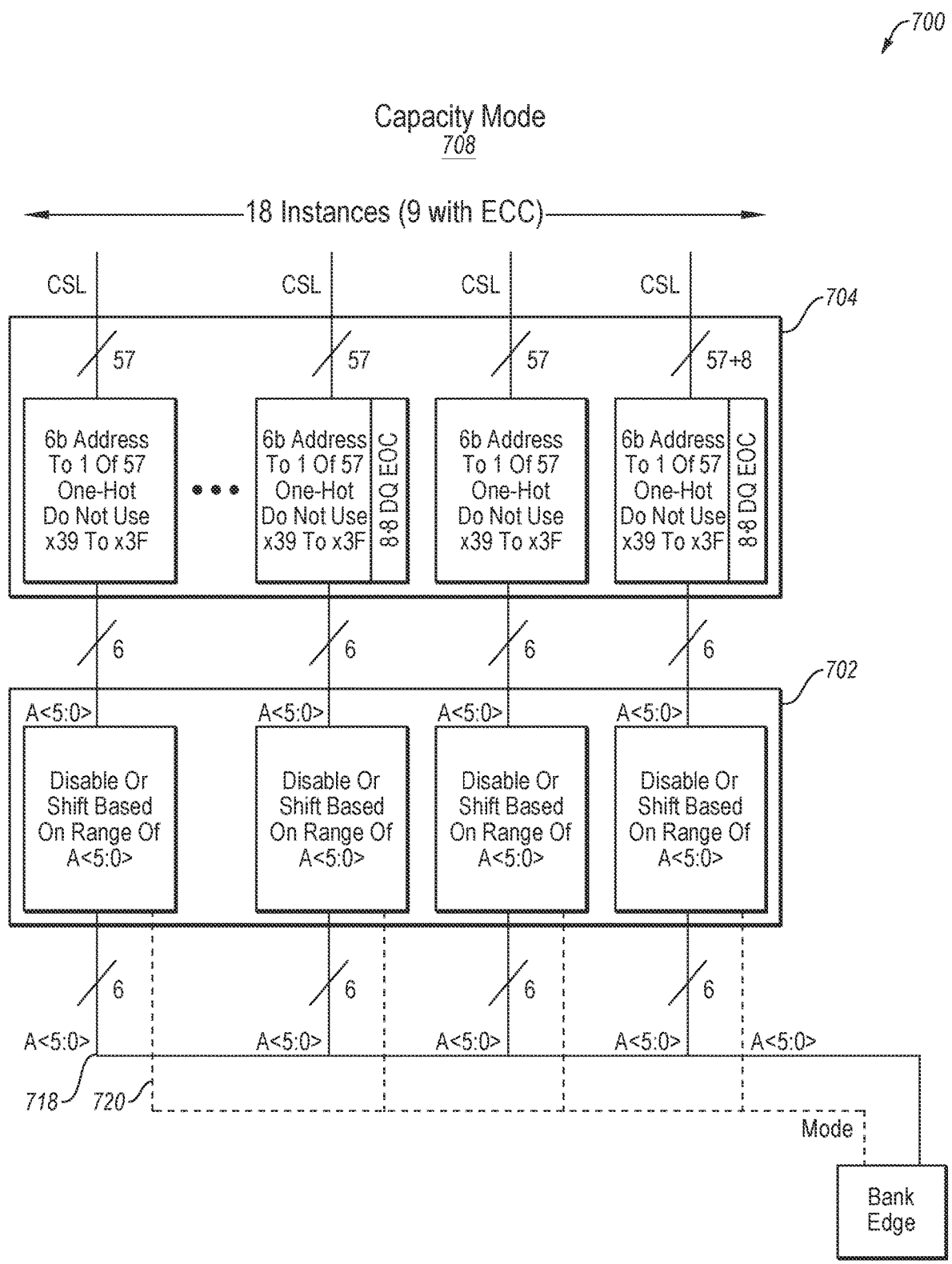
FIG. 7B is a block diagram of a variable-burst-length DRAM device with an address modification block in a capacity mode, according to at least one embodiment.

FIG. 7B is a block diagram of a variable-burst-length DRAM device 700 with the datapath modification block 702 in a capacity mode 708, according to at least one embodiment. As described above, the variable-burst-length DRAM device 700 is similar to the variable-burst-length DRAM device 300 of FIG. 3A, except the variable-burst-length DRAM device 700 has the distributed ECC structure in which parity is distributed with the data. In the capacity mode 708, the datapath modification block 702 disables or shifts an address 718 to the address decoder block 704 based on a mode indication 720, which indicates the capacity mode 708.

Figure 8:
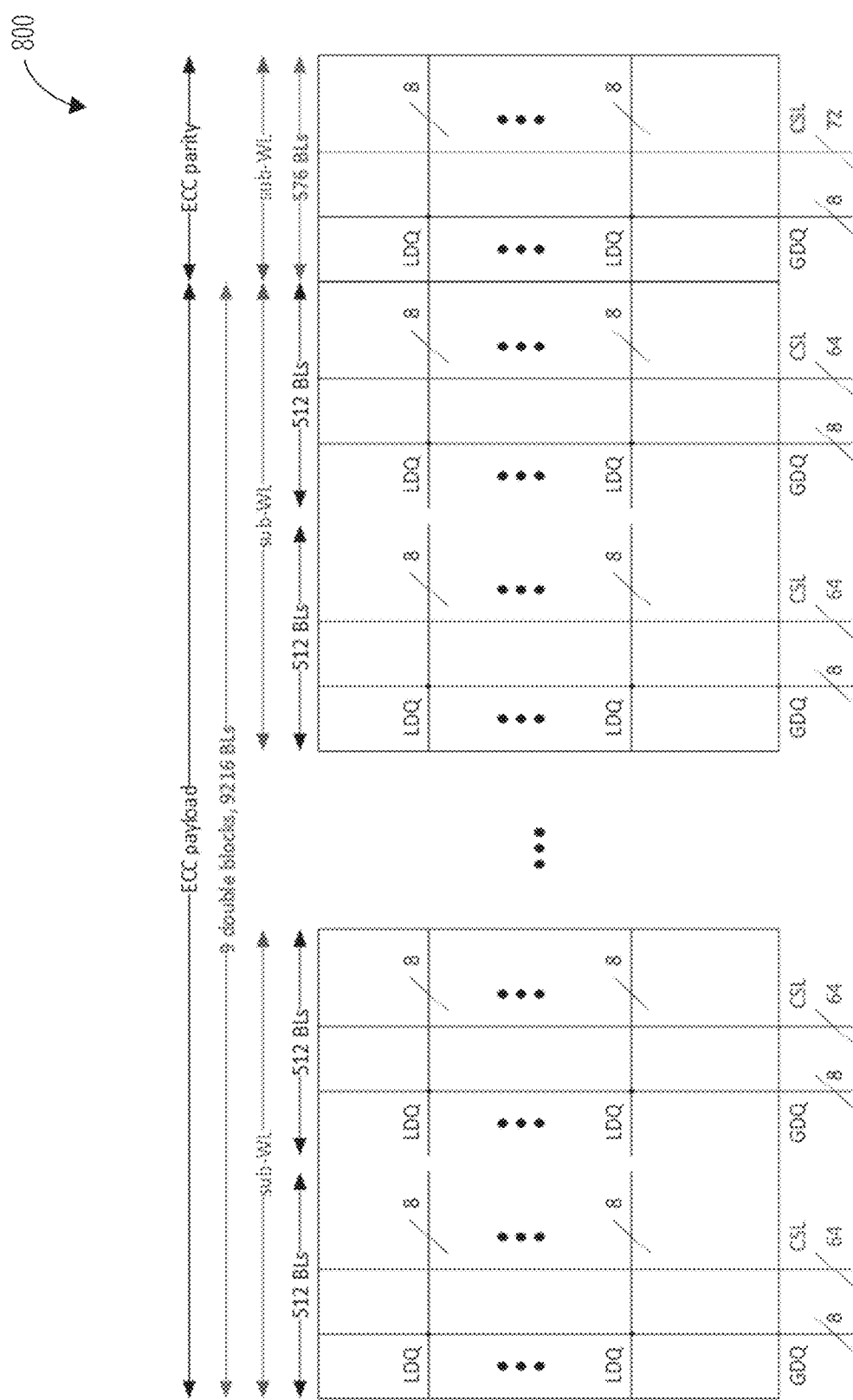
FIG. 8 illustrates an architecture of a variable-burst-length DRAM device with nine double blocks and 72 CSLs for two modes of operation, according to at least one embodiment.

FIG. 8 illustrates an architecture of a variable-burst-length DRAM device 800 with nine double blocks and 72 CSLs for two modes of operation, according to at least one embodiment. The variable-burst-length DRAM device 800 is similar to the variable-burst-length DRAM device 200, except the capacity mode needs one additional address bit. The pairwise disabling of blocks with data and a wider parity block gives access to the required number of bits for each column address. In the metadata mode, 64 bits of the parity block (0.65% of the total number of bits) are not used. In the capacity mode, all bits are used. For a distributed ECC, nine blocks would have 8 ECC CSLs each, instead of eight blocks.

Figure 9A:
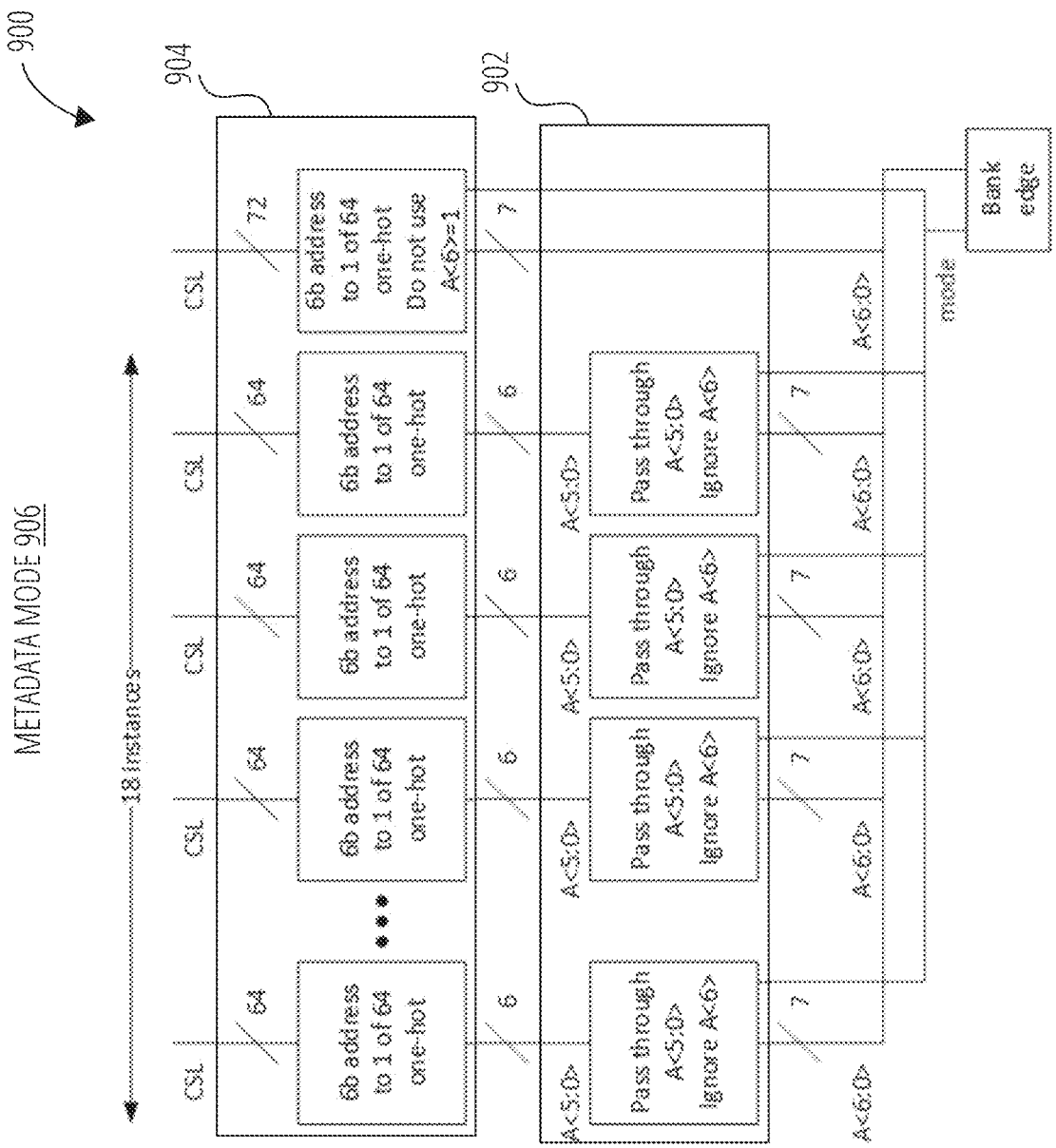
FIG. 9A is a block diagram of a variable-burst-length DRAM device with an address modification block in a metadata mode, according to at least one embodiment.

FIG. 9A is a block diagram of a variable-burst-length DRAM device 900 with an address modification block 902 in a metadata mode 906, according to at least one embodiment. The variable-burst-length DRAM device 900 is similar to the variable-burst-length DRAM device 300, except for the additional address bit described above with respect to FIG. 8. An address decoder block 904 can include multiple one-hot decoders that activate 1 of 64 CSLs based on 6 of the 7 address bits and an additional one-hot decoder that activates 1 of 72 CSLs based on 7 of the 7 address bits. The address modification block 902 can pass through an address based on a mode indicator that identifies the metadata mode 906 described above.

Figure 9B:
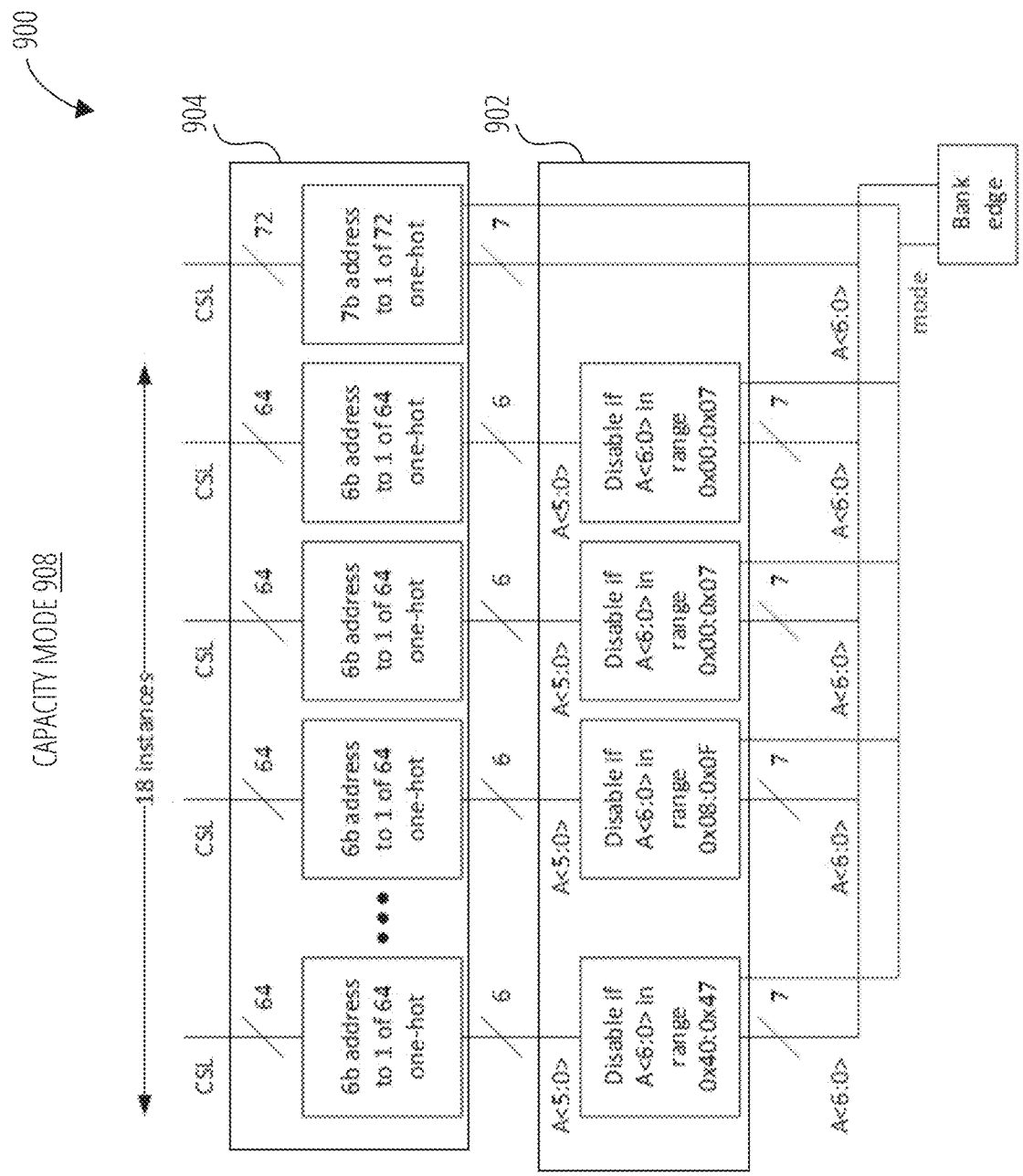
FIG. 9B is a block diagram of a variable-burst-length DRAM device with an address modification block in a capacity mode, according to at least one embodiment.

FIG. 9B is a block diagram of a variable-burst-length DRAM device 900 with the address modification block 902 in a capacity mode 908, according to at least one embodiment. The variable-burst-length DRAM device 900 is similar to the variable-burst-length DRAM device 300, except for the additional address bit described above with respect to FIG. 8. An address decoder block 904 can include multiple one-hot decoders that activate 1 of 64 CSLs based on 6 of the 7 address bits and an additional one-hot decoder that activates 1 of 72 CSLs based on 7 of the 7 address bits. The address modification block 902 can disable or shift an address based on a mode indicator that identifies the capacity mode 908 as described above.

The variable-burst-length DRAM device 900 can include similar datapath modification blocks and ECC blocks as described above with respect to FIG. 6A and FIG. 6B.

Figure 10:
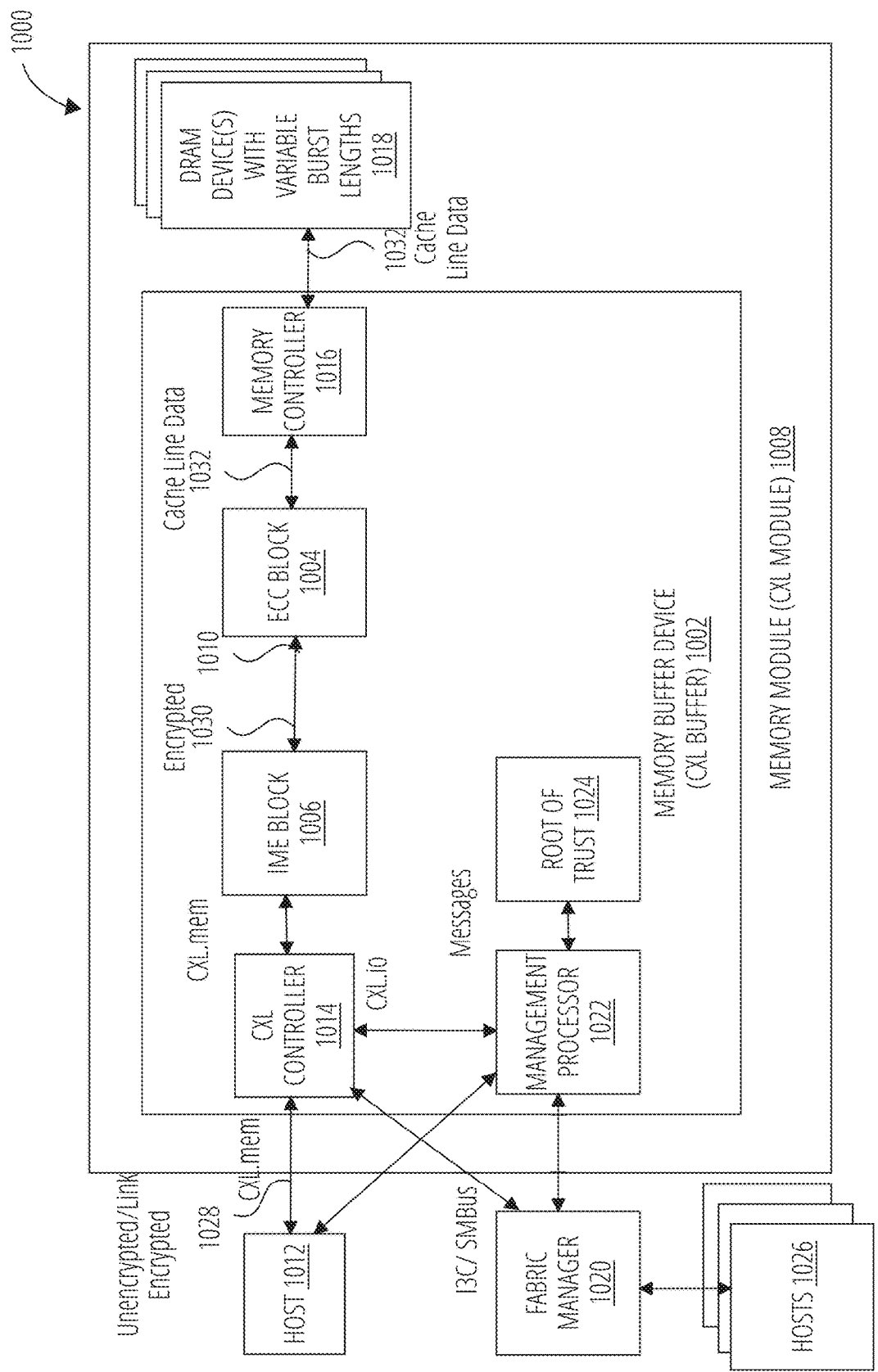
FIG. 10 is a block diagram of a memory system with a memory module with variable-burst-length DRAM devices according to at least one embodiment.

FIG. 10 is a block diagram of a memory system 1000 with a memory module 1008 with DRAM device(s) with variable burst lengths 1018 according to at least one embodiment. In one embodiment, the memory module 1008 includes a memory buffer device 1002 and one or more DRAM device(s) with variable burst lengths 1018. In one embodiment, the memory buffer device 1002 is coupled to one or more DRAM device(s) with variable burst lengths 1018 and a host 1012. In another embodiment, the memory buffer device 1002 is coupled to a fabric manager 1020 that is operatively coupled to one or more hosts 1026. In another embodiment, the memory buffer device 1002 is coupled to host 1012 and the fabric manager 1020. A fabric manager is software executed by a device, such as a network device or switch, that manages connections between multiple entities in a network fabric. The network fabric is a network topology in which components pass data to each other through interconnecting switches. A network fabric includes hubs, switches, adapter endpoints, etc., between devices.

In one embodiment, the memory buffer device 1002 includes an error correction code (ECC) block 1004 (e.g., ECC circuit) to detect and correct errors in cache lines being read from a DRAM device(s) with variable burst lengths 1018, and an IME block 1006 to generate a message authentication code (MAC) for each cache line to provide cryptographic integrity on accesses to the respective cache line. The ECC block 1004 can detect an error in a cache line. The ECC block 1004 can perform, or cause another entity to perform, an action responsive to the error. Action refers to any one or more operations performed as a result of the error. The one or more operations can be preventive actions, remedial actions, reporting actions, logging actions, or the like.

In a further embodiment, the memory buffer device 1002 includes a CXL controller 1014 and a memory controller 1016. The CXL controller 1014 is coupled to host 1012 or multiple hosts 1026 via the fabric manager 1020. The memory controller 1016 is coupled to the one or more DRAM device(s) with variable burst lengths 1018. In a further embodiment, the memory buffer device 1002 includes a management processor 1022 and a root of trust 1024. In at least one embodiment, the management processor 1022 receives one or more management commands through a command interface between the host 1012 (or fabric manager 1020) and the management processor 1022. In at least one embodiment, the memory buffer device 1002 is implemented in a memory expansion device, such as a CXL memory expander SoC of a CXL NVM module or a CXL module. The memory buffer device 1002 can encrypt unencrypted data 1028 (e.g., plain text or cleartext user data), received from a host 1012, using the IME block 1006 to obtain encrypted data 1030 before storing the encrypted data 1030 in DRAM device(s) with variable burst lengths 1018.

In some cases, the IME block 1006 can receive encrypted data for transmission across the link. The IME block 1006 can generate a metadata associated with the encrypted data 1030. In at least one embodiment, the IME block 1006 is an IME engine. In another embodiment, the IME block 1006 is an encryption circuit or encryption logic. The ECC block 1004 can receive the encrypted data 1030 from the IME block 1006. The ECC block 1004 can generate ECC information associated with the encrypted data 1030. The encrypted data 1030, the metadata and ECC information 1010 can be organized as cache line data 1032. The memory controller 1016 can receive the cache line data 1032 from the ECC block 1004 and store the cache line data 1032 in the DRAM device(s) with variable burst lengths 1018.

It should be noted that the memory buffer device 1002 can receive unencrypted data, but can also receive encrypted data as it traverses a link (e.g., the CXL link). This encryption is usually a link encryption, generally referred to in CXL as integrity and data encryption. The link encryption, in this case, would not persist to DRAM as the CXL controller 1014 in the memory module 1008 can decrypt the link data and verify its integrity prior to the flow described herein, where the IME block 1006 encrypts the data and generates the metadata. Although "unencrypted data 1028" is used herein, in other embodiments, the data can be encrypted data that is encrypted by the memory buffer device 1002 using a key only used for the link, and thus cleartext data exists within the SoC after the CXL controller 1014 and thus needs to be encrypted by the IME block 1006 to provide encryption for data at rest. In other embodiments, the IME block 1006 does not encrypt the data but still generates the metadata.

In at least one embodiment, the CXL controller 1014 includes two interfaces, a host memory interface (e.g., CXL.mem) and a management interface (e.g., CLX.io). The host memory interface can receive, from the host 1012, one or more memory access commands of a remote memory protocol, such as Compute Express Link (CXL) protocol, Gen-Z, Open Memory Interface (OMI), Open Coherent Accelerator Processor Interface (OpenCAPI), or the like. The management interface can receive, from the host 1012 or the fabric manager 1020 by way of the management processor 122, one or more management commands of the remote memory protocol.

In at least one embodiment, the IME block 1006 receives a data stream from a host 1012 and encrypts the data stream into the encrypted data 1030, and provides the encrypted data 1030 to the ECC block 1004 and the memory controller 1016. The memory controller 1016 stores the encrypted data 130 in the DRAM device(s) with variable burst lengths 1018 along with the metadata and ECC information 1010 as the cache line data 1032.

In some embodiments, the memory module 1008 has persistent memory backup capabilities where the management processor 1022 can access the encrypted data 1030 and transfer the encrypted data from the DRAM device(s) with variable burst lengths 1018 to persistent memory (not illustrated in FIG. 10) in the event of a power-down event or a power-loss event. The encrypted data 1030 in the persistent memory is considered data at rest. In at least one embodiment, the management processor 1022 transfers the encrypted data to the persistent memory using an NVM controller (e.g., NAND controller).

The IME block 1006 can include multiple encryption functions, such as a first encryption function that uses 256-AES encryption and a second encryption function that uses 512-AES encryption. In other embodiments, the encryption functions can also provide cryptographic integrity, such as using a message authentication code (MAC). In other embodiments, the cryptographic integrity can be provided separately from the encryption function. In some cases, the strength of the MAC and encryption algorithms can be different. The first encryption function can have a first encryption strength, such as 256-AES encryption. In at least one embodiment, the IME block 1006 is an IME engine with two encryption functions. In another embodiment, the IME block 1006 includes two separate IME engines, each having one of the two encryption functions. In another embodiment, the IME block 1006 includes a first encryption circuit for the first encryption function and a second encryption circuit for the second encryption function. Alternatively, additional encryption functions can be implemented in the IME block 1006. The memory controller 1016 can receive the encrypted data 1030 from the IME block 1006 and store the encrypted data 1030 in the DRAM device(s) with variable burst lengths 1018 from the IME block 1006.

In at least one embodiment, the MAC can be calculated on a first encrypted data stored with a second encrypted data as part of the algorithm (e.g., AES) or separately with a different algorithm. The memory controller 1016 can receive the encrypted data 1030 and metadata from the IME block 1006 and store the encrypted data 1030 and metadata in the DRAM device(s) with variable burst lengths 1018. The host-to-unencrypted memory path can bypass the IME block 1006 for all host transactions. The host-to-unencrypted memory path can still pass through the IME block 1006 for generating the metadata. In at least one embodiment, the encryption can be serialized (e.g., a first time for memory (DRAM) storage and a second time with a second standard for persistent storage. As described herein, the keys can be stored in persistent memory storage. The persistent memory storage can be used to securely store and restore the encrypted contents of the DRAM to a previous state that can be accessed by the host and restore the keys necessary to decrypt this data.

In at least one embodiment, the metadata can be stored and transferred as metadata in connection with cache line data. The metadata can include a first portion with ECC information and a second portion with the metadata. In at least one embodiment, the metadata can be 32 bits, with 27 bits used for the metadata. In another embodiment, the metadata can be 16 bits with 11 bits for the metadata. The number of bits of the metadata can vary between the ECC information and the metadata. In another embodiment, the metadata can include only the metadata. The metadata can be stored and transferred in side-band metadata or in-band metadata, as illustrated and described below with respect to FIG. 11.

Figure 11:
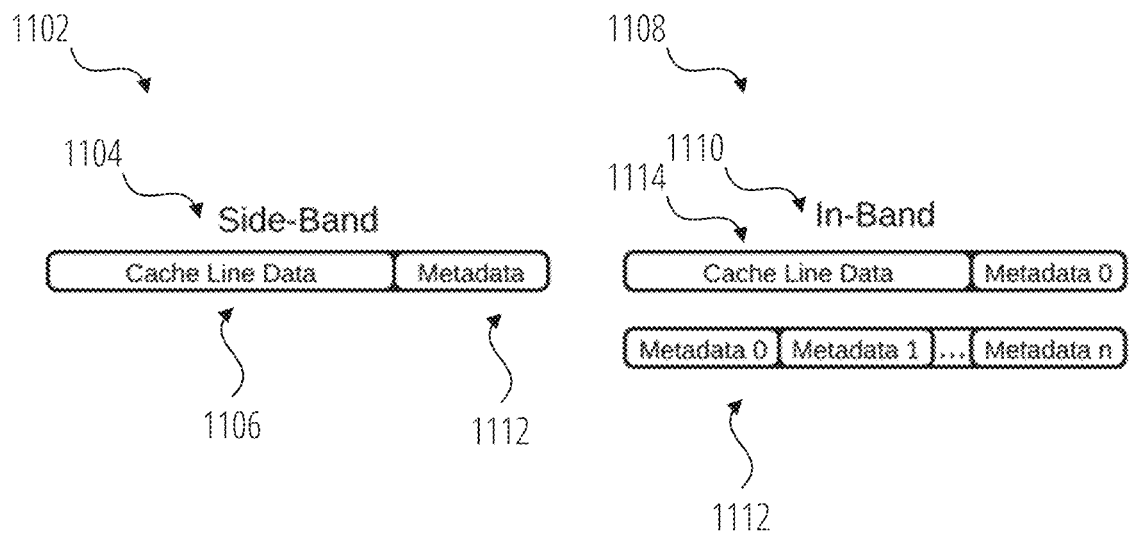
FIG. 11 illustrates a cache line in which a metadata is stored and transferred as side-band metadata associated with cache line data and a cache line in which a metadata is stored and transferred as in-band metadata associated with cache line data, according to various embodiments.

FIG. 11 illustrates a cache line 1102 in which metadata 1112 is stored and transferred as side-band metadata 1104 associated with cache line data 1106 and a cache line 1108 in which metadata 1112 is stored and transferred as in-band metadata 1110 associated with cache line data 1112, according to various embodiments. In general, the metadata 1112 can include ECC symbols, MACs, or the like. The metadata 1112 can also store counters, such as counters used to prevent replay attacks, as well as counters associated with the number of ECC errors. The metadata 1112 can be stored as side-band metadata 1104 or in-band metadata 1110. The side-band metadata 1104 can be accessible when the cache line 1102 is read from memory. The in-band metadata 1110 can be stored in another location than the cache line data 1114, such as in a static RAM (SRAM) or DRAM. When the cache line 1114 is read, an additional memory read would be performed to retrieve the metadata 1112 in the in-band metadata 1110.

It is to be understood that the above description is intended to be illustrative and not restrictive. Many other implementations will be apparent to those of skill in the art upon reading and understanding the above description. Therefore, the disclosure scope should be determined with reference to the appended claims, along with the full scope of equivalents to which such claims are entitled.

In the above description, numerous details are set forth. It will be apparent, however, to one skilled in the art that the aspects of the present disclosure may be practiced without these specific details. In some instances, well-known structures and devices are shown in block diagram form rather than in detail to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

However, it should be borne in mind that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "setting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk, including floppy disks, optical disks, CD-ROMs, magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, each coupled to a computer system bus.

The algorithms and displays presented herein are not inherently related to any particular computer or other apparatus. Various general-purpose systems may be used with programs in accordance with the teachings herein, or it may prove convenient to construct more specialized apparatuses to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any procedure for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

What is claimed is:

1. A dynamic random access memory (DRAM) device comprising:
    a first mode of operation having a first burst length and a first column address range;
    a second mode of operation having a second burst length and a second column address range, wherein only one of the first burst length and the second burst length is a power of two; and
    an error correction code (ECC) block to generate, receive, and store ECC parity associated with data in the first mode of operation and the second mode of operation, wherein a first product of the first column address range and the first burst length and a second product of the second column address range and the second burst length are substantially the same.

2. The DRAM device of claim 1, wherein the first burst length is smaller than the second burst length, and wherein the second column address range is a ceiling function of a ratio of the first burst length to the second burst length multiplied by the first column address range.

3. The DRAM device of claim 1, wherein the second mode of operation is used to transmit or receive metadata together with data, and wherein the first mode of operation is used to transmit or receive only data.

4. The DRAM device of claim 1, wherein:
    the first mode of operation is a capacity mode in which a first amount of data is accessed simultaneously with a first number of column select lines (CSLs);
    the second mode of operation is a metadata mode in which a second amount of data is accessed simultaneously with a second number of CSLs;
    the second amount of data is greater than the first amount of data;
    the second number of CSLs is less than the first number of CSLs;
    the first amount of data comprises first data; and
    the second amount of data comprises second data and metadata associated with the second data.

5. The DRAM device of claim 4, wherein the first number of CSLs is 16, and the second number of CSLs is 18.

6. The DRAM device of claim 4, further comprising:
    a plurality of memory blocks; and
    a memory block where ECC parity is stored, wherein:
    a number of column addresses in the plurality of memory blocks corresponds to an address range of the metadata mode; and
    the number of column addresses in the memory block corresponds to a range of the capacity mode.

7. The DRAM device of claim 6, wherein, in the capacity mode, some of the plurality of memory blocks are not used based on a column address.

8. The DRAM device of claim 1, wherein the ECC block is an on-die ECC block, wherein the ECC block uses a codeword size corresponding to the second column address range of the second mode of operation, and wherein bits in a codeword that do not have memory blocks associated with them are set to zero.

9. The DRAM device of claim 1, wherein a mode register set command is used to switch between the first mode of operation and the second mode of operation.

10. A dynamic random access memory (DRAM) device with two modes of operation having different combinations of burst lengths and column address ranges, the DRAM device comprising:
    a circuit to store parity data associated with data in a first mode of operation or a second mode of operation, wherein:
    the first mode of operation has a first burst length and a first column address range;
    the second mode of operation has a second burst length and a second column address range;
    only one of the first burst length and the second burst length is a power of two; and
    a first product of the first column address range and the first burst length and a second product of the second column address range and the second burst length are substantially the same.

11. The DRAM device of claim 10, further comprising:
    an address decoder block coupled to a plurality of column select lines (CSLs), wherein at least some of the plurality of CSLs are active during an access; and
    an address modification block to receive a first address in the first mode of operation and a second address in the second mode of operation, wherein:
    in the first mode of operation, the address modification block is to disable or shift the first address to a third address based on a range of the first address before passing the third address to the address decoder block; and in the second mode of operation, the address modification block is to pass the second address to the address decoder block.

12. The DRAM device of claim 11, wherein the address decoder block comprises:
a set of one-hot decoders coupled to the address modification block, the set of one-hot decoders to receive the second address in the second mode of operation and the third address in the first mode of operation; and
an additional one-hot decoder to receive the first address in the first mode of operation and the second address in the second mode of operation.

13. The DRAM device of claim 12, wherein at least some addresses are not used by the additional one-hot decoder in the first mode of operation.

14. The DRAM device of claim 11, wherein the plurality of CSLs comprises 1090 CSLs, wherein 19 CSLs of the 1090 CSLs are active at a time, wherein 152 bits are accessed during the access, with the 152 bits comprising 144 bits of data and metadata and 8 bits of parity.

15. The DRAM device of claim 14, wherein the 8 bits of parity are distributed among eight blocks of 9 bits and eight blocks of 8 bits, wherein each of the 8 bits of parity is on a same sub-word line (WL) as data.

16. The DRAM device of claim 10, further comprising:
a mode register to store a first value indicative of the first mode of operation or a second value indicative of the second mode of operation;
an address decoder block coupled to the mode register; and
an address modification block coupled to the mode register, wherein:
the address modification block is to pass through an address to the address decoder block responsive to the second value being stored in the mode register; and
the address modification block is to modify the address before passing the address through to the address decoder block responsive to the first value being stored in the mode register.

17. The DRAM device of claim 16, wherein the address modification block is to modify the address by:
disabling a number of blocks based on a range of the address; and
shifting down the address for each block after the range in which the number of blocks is disabled.

18. The DRAM device of claim 17, further comprising a datapath modification block comprising:
a set of multiplexers; and
control logic coupled to the set of multiplexers and the mode register, the control logic to receive the address, wherein:
the control logic is to cause the set of multiplexers to pass data through to an ECC circuit responsive to the second value being stored in the mode register;
the control logic is to cause a number of multiplexers of the set of multiplexers to pass a set of zeros to the ECC circuit responsive to the first value being stored in the mode register, the number of multiplexers being identified by the range of the address;
the control logic is to cause the remaining multiplexers of the set of multiplexers to pass data through to the ECC circuit responsive to the first value being stored in the mode register; and
the number of multiplexers corresponds to the number of blocks disabled.

19. A memory module comprising:
a dynamic random access memory (DRAM) device having a plurality of memory blocks, wherein the DRAM device has two modes of operation having different combinations of burst lengths and column address ranges;
an address decoder block coupled to a plurality of column select lines (CSLs), wherein at least some of the plurality of CSLs are active during an access; and
an address modification block to receive a first address in a first mode of operation and a second address in a second mode of operation, wherein:
the first mode of operation has a first burst length and a first column address range;
the second mode of operation has a second burst length and a second column address range;
only one of the first burst length and the second burst length is a power of two; and
a first product of the first column address range and the first burst length and a second product of the second column address range and the second burst length are substantially the same;
in the first mode of operation, the address modification block is to disable or shift the first address to a third address based on a range of the first address before passing the third address to the address decoder block; and
in the second mode of operation, the address modification block is to pass the second address to the address decoder block.

20. The memory module of claim 19, wherein the address decoder block comprises:
a set of one-hot decoders coupled to the address modification block, the set of one-hot decoders to receive the second address in the second mode of operation and the third address in the first mode of operation; and
an additional one-hot decoder to receive the first address in the first mode of operation and the second address in the second mode of operation.

* * * * *